US006471817B1

(12) United States Patent
Emmert

(10) Patent No.: US 6,471,817 B1
(45) Date of Patent: Oct. 29, 2002

(54) MULTIPART LASERLICENSING SHEET WITH DECALS AND/OR PATCHES

(75) Inventor: David Emmert, Angola, IN (US)

(73) Assignee: Moore North America, Inc., Stamford, CT (US)

(*) Notice: Subject to any disclaimer, the term of this patent is extended or adjusted under 35 U.S.C. 154(b) by 0 days.

(21) Appl. No.: 09/559,178

(22) Filed: Apr. 27, 2000

(51) Int. Cl.[7] .......................... B32B 31/12; B32B 31/18

(52) U.S. Cl. ....................... 156/257; 156/247; 156/270; 156/275.5; 156/277; 156/289; 156/290; 156/271

(58) Field of Search ................................ 156/277, 289, 156/268, 270, 275.5, 247, 248, 257, 290, 271; 283/94, 100, 101, 109; 428/194, 195, 201, 42.1, 42.2

(56) References Cited

U.S. PATENT DOCUMENTS 4,379,573 A 4/1983 Lomeli et al.
4,428,997 A 1/1984 Shulman
5,219,183 A * 6/1993 McKillip ................ 283/101 X
5,403,236 A * 4/1995 Greig
5,413,830 A * 5/1995 Edwards
5,462,488 A * 10/1995 McKillip ................ 283/101 X
5,522,956 A * 6/1996 McCannel
5,562,789 A * 10/1996 Hoffmann ............... 156/270 X
5,601,682 A * 2/1997 Longtin .................. 156/268 X
5,637,369 A 6/1997 Stewart
5,660,896 A * 8/1997 Normand et al.
5,704,650 A 1/1998 Laurash et al.
5,720,499 A 2/1998 Sakashita
5,756,175 A 5/1998 Washburn
5,924,738 A 7/1999 Konkol et al.
6,053,535 A * 4/2000 Washburn et al. ...... 283/101 X
6,149,204 A * 11/2000 Casper .................... 283/109 X
6,214,153 B1 * 4/2001 Chess ...................... 156/268 X
6,217,078 B1 * 4/2001 Roth et al. .............. 283/101 X
6,340,512 B1 * 1/2002 Mercer et al. ............. 428/42.2
6,352,287 B2 * 3/2002 Casagrande ............... 283/94 X
6,358,587 B1 * 3/2002 Saint et al. ............. 283/101 X

* cited by examiner

*Primary Examiner*—Curtis Mayes
(74) *Attorney, Agent, or Firm*—Nixon & Vanderhye PC

(57) ABSTRACT

A laser printable sheet with vehicular registration and permitting decals and/or stickers is produced in a manner that insures the sheet lays-flat, rather than being crooked, so that it does not cause significant jamming problems in laser printers. Adhesive-release material is spot coated on a web back surface, including a first patch, the back surface is imaged with static indicia, and a substantially transparent plastic pressure sensitive adhesive laminate is applied over the back surface, including over the adhesive release material patch and first static indicia. The face is die cut at the first patch within the parameter of the patch to form the first die cut portion, which is then sucked off the substrate to provide an open area with exposed transparent plastic and pressure sensitive adhesive, and then a piggy back decal is blown onto the open area. The decal is preferably a license plate decal having a reflective visible surface in vehicular registration and permitting indicia. Preferably the sheet also includes an inspection sticker, may include a second license plate decal, as well as variably printed registration information.

16 Claims, 3 Drawing Sheets

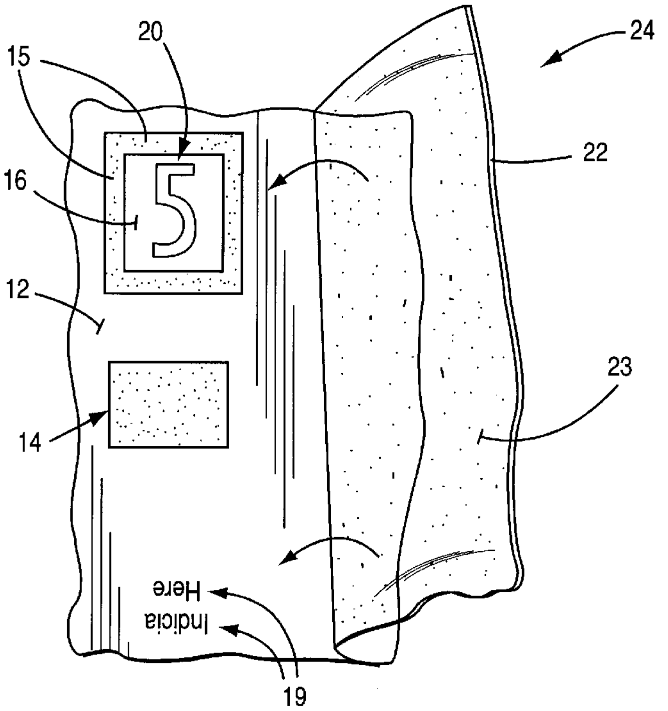
Fig. 3
Fig. 8
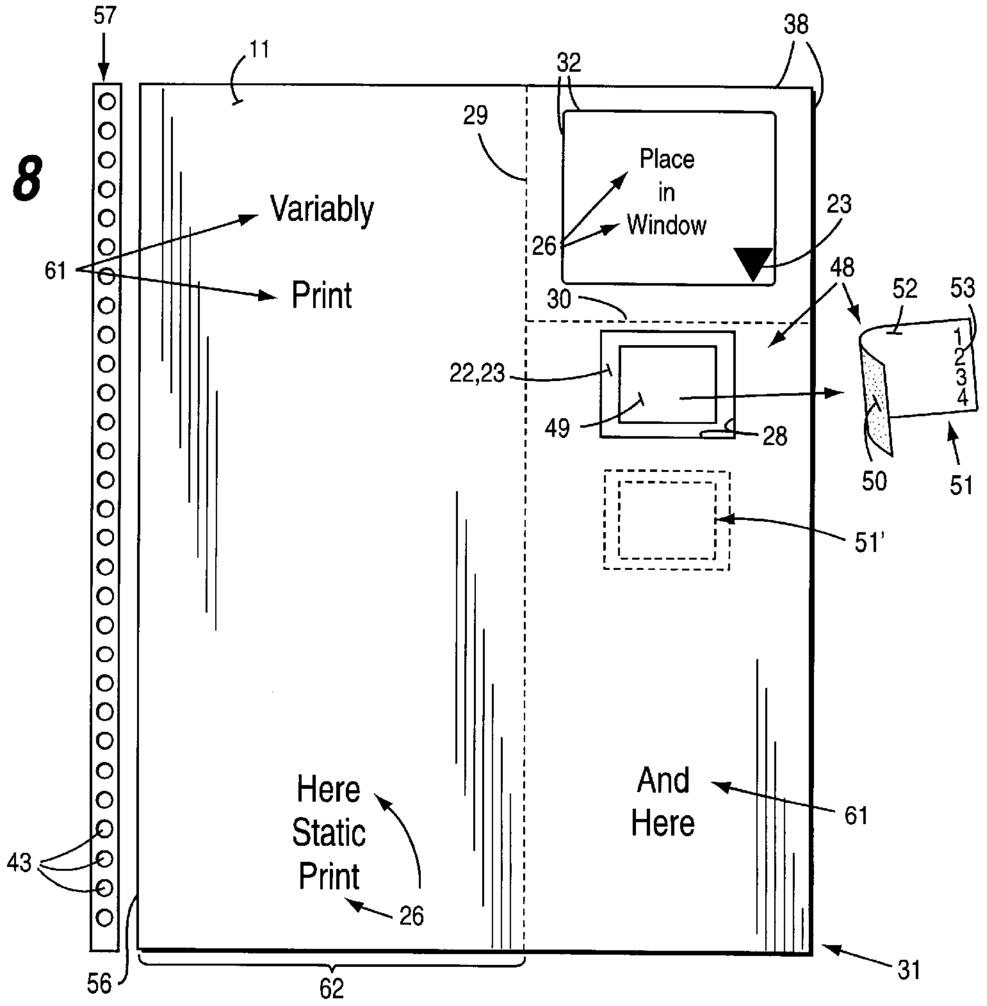

MULTIPART LASERLICENSING SHEET WITH DECALS AND/OR PATCHES

BACKGROUND AND SUMMARY OF THE INVENTION

For many functions, especially transportation functions, it is desirable to have a business form with one or more decals or stickers associated therewith. For example, for governmental registration or permitting of vehicles it is highly desirable to have a single sheet of paper which has at least one license plate decal thereon, and preferably also an inspection sticker and/or second license plate decal. It is also desirable to provide registration information on the same sheet, and to provide a sheet that is laser printable so that the variable indicia (such as vehicle registration number, owner name and address, etc.) can be variably imaged (preferably simplex printed by the entity applying the variable imaging) on a form in a simple and effective manner using a conventional laser printer.

One problem with producing registration sheets with decals and/or stickers thereon is that when the decals and stickers are applied to the sheet off line, the sheets often are crooked. That is, when fed through a laser printer the feeding is erratic and causes significantly frequent jamming and/or print problems. Therefore, there is a significant need for a lay-flat laser printable sheet with at least one decal or sticker, and preferably a plurality of decals and/or stickers, that may be constructively used with conventional laser printers, particularly for vehicular registration and permitting purposes.

According to the present invention a method of making substantially lay-flat flat laser printable sheets, and the sheets so produced, are provided which include at least one decal or sticker, and preferably a plurality of decals and/or stickers. While the invention is particularly described herein with respect to vehicle registration and permitting functions, it is to be understood that the method and products according to the invention may also have other uses. The sheets of the invention may be simplex printed with variable information by conventional office printers.

According to one aspect of the present invention there is provided a method of making a substantially lay-flat laser printable sheet with at least one decal or sticker using a substrate having at least a laser printable face, and a back surface, comprising: a) Adhesive-release material spot coating the substrate back surface, including providing a substantially continuous first adhesive-release material patch. b) Imaging the back surface with first static indicia. c) Applying a substantially transparent plastic and pressure sensitive adhesive laminate over at least a significant part of the back surface, including over the spot coating and first static indicia. d) Die cutting the face at the first patch, substantially within the perimeter of the first patch to form a first die cut portion. e) Removing the first die cut portion from the substrate to provide an open area with exposed transparent plastic and pressure sensitive adhesive. And f) providing a piggyback decal on the open area.

Typically in the practice of the method the substrate is web, and the method further comprises: g), after e) and before f), providing marginal holes in the web, h) winding up the web, and i) unwinding the web. The method may still further comprise after f), j) slitting the marginal holes off the web, and k) forming the web into substantially lay-flat laser printable sheets. Typically, c) is practiced to apply the laminate over substantially the entire back surface of the substrate which will become the sheets from k), and typically e) is practiced by sucking off the die cut portion, and is f) practiced by blowing on a reflective visible surface piggyback decal. The method may further comprise l) variably imaging the face of the sheets from k) using a laser printer, and typically b) and l) are practiced to image vehicular registration or permitting indicia on the substrate.

Also, in the practice of the method, c) may be further practiced to apply a laminate transparent plastic that is matte and pen write-able, and having a thickness of about 0.5–2 mils, e.g. about 1 mil.

Also, a) may be further practiced to form a second patch defining a border but substantially devoid of adhesive-release material within the border and d) is practiced to provide a second face die cut at the second patch. For example, where the substrate is a web the method further comprises after f), forming the web into substantially lay-flat laser printable sheets; and typically a)–f) are further practiced to provide the second patch with vehicular registration or permitting indicia thereon and capable of functioning as a vehicle inspection sticker. Also, the method may further comprise g) forming a third die cut in the back surface which penetrates through the laminate to the substrate, an area defined by the third die cut being larger than an area defined by the second die cut, and substantially concentric therewith, and being substantially coextensive with lines of weakness (e.g. perforations) formed in the substrate.

The method may still further comprise static printing a substrate face prior to f), and a) is practiced using UV silicone adhesive release material; and further comprising curing the silicone release material prior to b)–f). Also, a) may be practiced using bond paper as the substrate, and f) is practiced to produce laser printable sheets having either letter size, A4, or legal size dimensions.

In the practice of the method a)–f) may be practiced substantially sequentially, although a number of other variations of the various method procedures may be performed in a wide variety of manners, just so that the end results that are desired (namely lay-flat laser printable sheets) are provided.

The invention also relates substantially to lay-flat laser printable sheets produced by the method as set forth above.

According to another aspect of the present invention there is provided a substantially lay-flat laser printable sheet comprising: A substrate having a back surface, and a laser printable face. A substantially transparent plastic and pressure sensitive adhesive laminate on the back surface. A first die cut in the face to the laminate defining an open area. A piggyback decal in the open area having a reflective visible surface and vehicular registration or permitting indicia thereon. First static indicia on the back surface under the laminate and second static indicia on the face. The first and second static indicia comprising vehicular registration or permitting indicia.

The sheet may further comprise variable vehicular registration or permitting indicia on the face, and typically the sheet is letter, A4, or legal size, preferably letter size. Also, the substrate is typically bond paper (such as 100# bond C1S paper), and the laminate typically includes matte and pin write-able plastic having a thickness of about 0.5–2 mils (e.g. about 1 mil). The sheet may also further comprise a second die cut in the face defining a sticker, the sticker having vehicular registration or permitting indicia on the face and back surface thereof. Also, the sheet may further comprise a third die cut in the back surface extending through the laminate to the substrate and defining an area greater than an area defined by the second die cut, and perforations in the substrate substantially coextensive with the third die cut and/or the sheet may further comprise another die cut in the face to the laminate defining the second open area, and a second piggyback decal in the second open area and having a reflective visible surface and vehicular registration or permanent indicia thereon, such as that associated with a typical license plate decal.

According to yet another aspect of the present invention there is provided a substantially lay-flat laser printable sheet comprising: A bond paper substrate having a back surface, and a laser printable face. A substantially transparent plastic and pressure sensitive adhesive laminate on the back surface, the laminate include matte and pen writeable plastic having a thickness of about 0.5–2 mils. A first die cut in the face to the laminate defining an open area. A piggyback decal in the open area. And first static indicia on the back surface under the laminate. The sheet may further comprise a second die cut in the face defining a sticker, for example, an inspection sticker having conventional indicia associated therewith for a vehicle, such as a state inspection sticker adhered inside a window of an automobile.

It is the primary object of the present invention to provide a lay-flat laser printable sheet with at least one decal or sticker, and which is suitable for use for vehicle permitting or registration purposes. This and other objects of the invention will become clear from an inspection of the detailed description of the invention and from the appended claims.

BRIEF DESCRIPTION OF THE DRAWINGS

FIG. 3 is a front detail view showing the practice of the present invention in making a more complete intermediate from the intermediate of FIG. 2;

FIG. 8 is a front view of a final lay-flat laser printable sheet according to the present invention, and schematically illustrating variable indicia imaged thereon.

DETAILED DESCRIPTION OF THE DRAWINGS

Figure 1:
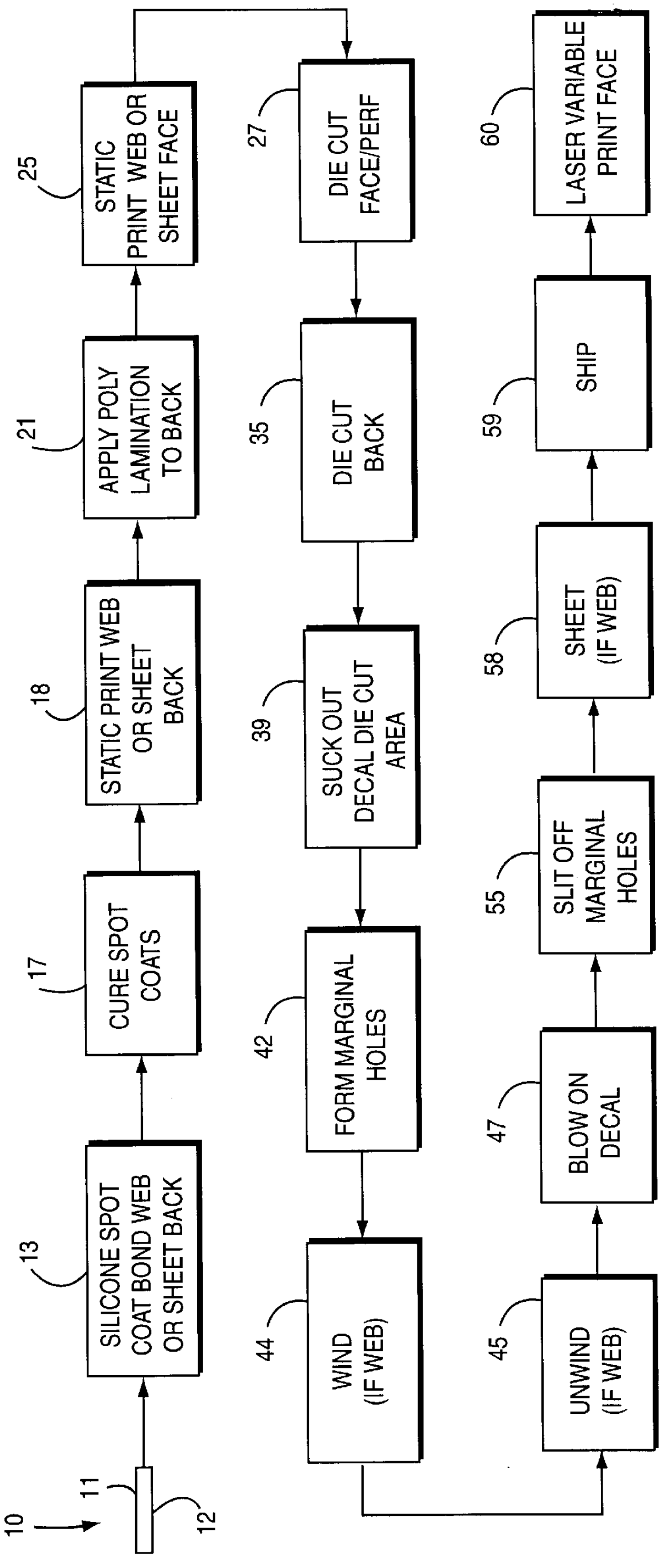
FIG. 1 is a schematic box diagram indicating the exemplary method steps that may be performed in the practice of the present invention.

A box diagram of the exemplary method according to the present invention is illustrated in FIG. 1. The method is initiated utilizing a substrate, shown generally by reference numeral 10 in FIG. 1, having at least a laser printable face 11, and a back surface 12. While the substrate 10 may have a wide variety of forms, preferably it is bond paper, such as a 100# bond sheet C1S, although a wide variety of weights and types may be provided, with typical weights between about 70–130 lbs. per 1000 sheet 11 inch by 26 inch ream. The method of FIG. 1 may be practiced using all conventional equipment.

Figure 2:
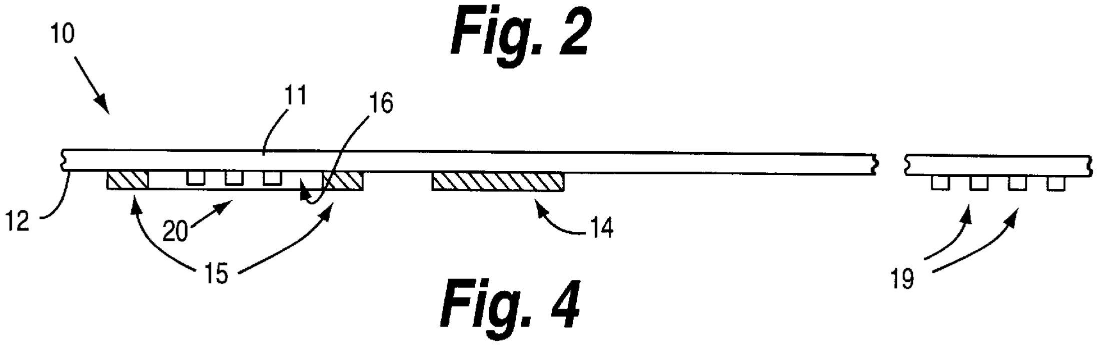
FIG. 2 is a side schematic view, with the portions thereof greatly enlarged in size and in proportion, of a first intermediate used in the practice of the present invention.

The first procedure illustrated in FIG. 1, generally by box 13, is to spot coat the substrate 10 back surface 12 with an adhesive release material, such as UV curable silicone. The spot coating includes at least a substantially continuous first adhesive-release material patch, shown schematically at 14 in FIGS. 2 and 3, for what ultimately will become—in the preferred embodiment—a license plate decal. Also, the spot coating is preferably practiced to form a second patch defining a border—shown schematically at 15 in FIGS. 2 and 3, such as a ¾ inch wide border, having a center 16 that is substantially devoid of the adhesive release material, as also seen in FIGS. 2 and 3. Where other decals or stickers will be applied, other patches like the patches 14 and/or 15 may be provided.

Particularly where the adhesive release material is UV curable silicone, the next procedure in the method of FIG. 1 is to cure the spot coats, as indicated schematically at 17, utilizing ultraviolet light in the case of UV curable silicone.

Either before or after the procedures 13, 17, the substrate back surface 12 is static printed, as indicated schematically at 18 in FIG. 1. The static printing may be done utilizing any conventional imaging equipment, such as a flexographic press. The static indicia—seen schematically at 19 and 20 in FIGS. 2 and 3—may be any suitable indicia depending upon the ultimate use to which the business forms being produced are put. In the preferred embodiment where vehicular registration or permitting is a desired end use for the business form produced, the indicia 19, 20 are vehicular registration or permitting indicia. For example, the indicia 20 illustrated in FIG. 3 is the month of the year when a vehicle to which a sticker ultimately containing the indicia 20 is applied is to be inspected.

Figure 4:
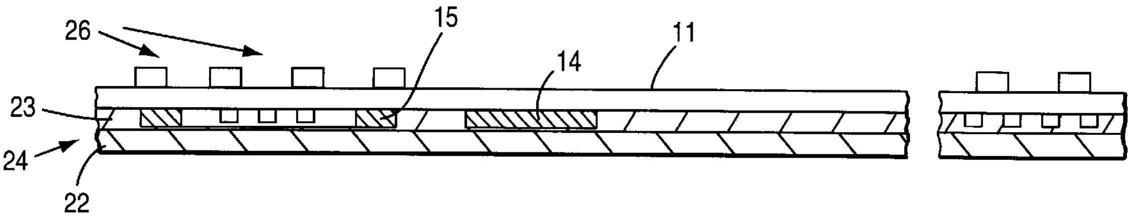
FIG. 4 is a view like that of FIG. 2 only showing the more complete intermediate produced from FIG. 3 after the laminate is applied to the back surface thereof.

After the procedures 13, 17 and 18, the next procedure—illustrated schematically at 21 in FIG. 1—is to apply a poly-lamination to the back surface 12. The poly-lamination typically comprises substantially transparent plastic having a pressure sensitive adhesive on one face thereof. While a wide variety of plastics may be utilized, MYLAR® brand polyester is one particularly suitable plastic, having a thickness of between about 0.5–2 mils, e.g. about one mil, with a conventional permanent or removable pressure sensitive adhesive on one face. The opposite face of the plastic laminate preferably has a matte finish, and is pen writable. FIGS. 2 and 3 illustrate the application (with the components greatly exaggerated in size and proportion for clarity of illustration) of the laminate to the subsrate 10. As seen most clearly in FIGS. 3 and 4, the plastic component of the laminate being shown by reference numeral 22 and the pressure sensitive adhesive on one face thereof shown by reference numeral 23, the components 22, 23 together providing the laminate 24. The laminate 24 is applied using conventional equipment, and covers at least a significant portion of the back surface 12, and in the preferred embodiment substantially completely covers the back surface 12, including at the patches 14, 15.

After procedure 21 FIG. 1, the next procedure is preferably to static print the substrate 10, as indicated schematically at 25 (although 25 may be practiced before 21). The indicia that is printed on the face 11 is shown schematically at 26 in FIG. 4 and 8. Where the ultimate business form produced is used for vehicular registration or permitting, the static indicia 26 also relates to vehicle permitting or registration, such as being boxes calling for a vehicle identification number, driver/owner identification information, registration or permitting fees, etc.

The procedure 27, which is next indicated in FIG. 1, is to die cut the face 11, and also desirably to perforate the substrate 10, the die cutting and perforating both being performed using conventional equipment. A first die cut, indicated schematically at 28 in FIGS. 5 through 8, and is slightly larger than a license plate decal—or other decal to be associated thereof—around the periphery thereof. The perforations, seen at 29 and 30 in FIG. 8, for example, divide the ultimate sheet that is to be produced—illustrated schematically at 31 in FIG. 8—into various sections so that the sections perform or implement different functions.

Figure 5:
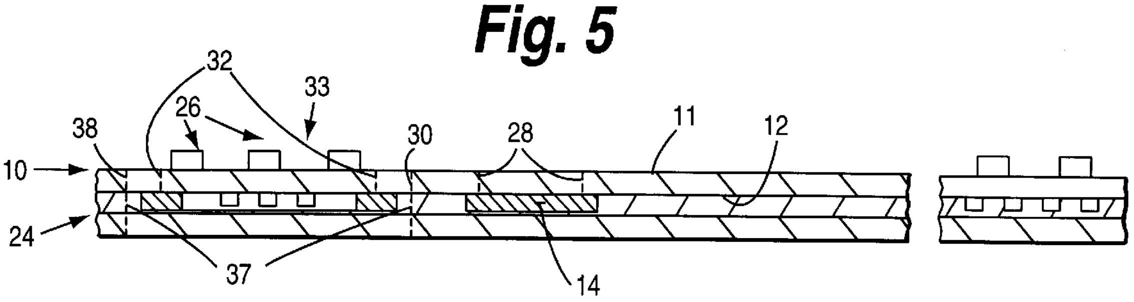
FIG. 5 is a view like that of FIG. 4 only at a further stage of production.
Figure 6:
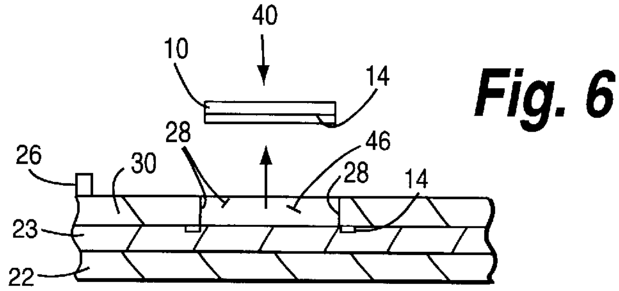
FIG. 6 is a more detailed view of that of FIG. 5 showing the first die cut portion being sucked off.
Figure 7:
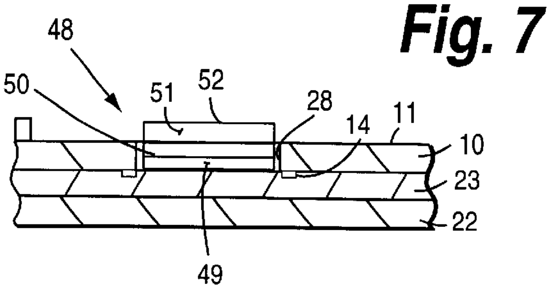
FIG. 7 is a view like that of FIG. 6 only showing a piggyback decal mounted in the open area thereof.

The procedure 27 also preferably includes forming a second die cut illustrated schematically at 32 in FIGS. 5 and 8 which is the appropriate size for a sticker to be formed from the sheet 31. For example, the dimensions of the die cut 32 may be about 2 inches by 2 inches which would be the typical dimensions for an inspection sticker, shown schematically at 33 in FIGS. 5 and 8.

As indicated by box 35 in FIG. 1, the next procedure in the method may be to die cut the back surface as indicated schematically at 37 in FIG. 5. The die cut 37 does not cut the substrate 10, but rather cuts through the laminate 24 up to the back surface 12 of the substrate 10, and in alignment with the perforations 29, 30 surrounding the sticker 33. That is, the die cut 37 will be larger than the die cut 32 and substantially concentric therewith, for example, in the embodiment illustrated in the drawings where the sticker 33 is an inspection sticker for a vehicle, the die cut 37 may define an area of about 3 inches by 3 inches. The third die cut 37 is utilized since perforations 29, 30 are not capable of penetrating effectively the laminate 24.

It will be noted that in FIG. 8 that two portions of the die cut 37 will be aligned with the perforation 29, up to the perforation 30, and the perforation 30. However, FIG. 8 shows the substrate cut from the web configuration illustrated in FIGS. 2 through 7 to a final substantially lay-flat sheet 31 and therefore the edges (one or both) 38 are formed during sheeting, or are pre-existing in the web or a part of a pre-existing sheet where the substrate 10 is a sheet instead of a web. Therefore, depending upon the details of construction the edges 38 may either be formed originally in the substrate 10, may be slit, 30 or may be otherwise formed, and whether the third die cut 37 is provided thereat will depend upon the details of construction. FIG. 5 illustrates the embodiment where the edge 38 is formed during the sheeting operation (as hereinafter described).

As illustrated schematically at 39 in FIG. 1, the next procedure is preferably removal of the first die cut portion (cut by the die cut 28) from the substrate. The removal of the first die cut portion, which is illustrated schematically at 40 in FIG. 6, may be effected by a wide variety of techniques such as by sucking it out of the die cut area using a vacuum source. The reason why the portion 40 can be removed is because of the adhesive release material patch 14, the die cut 28 being substantially completely within the area formed by the patch 14, as clear from both FIGS. 5 and 6. Because of the adhesive release material patch 14 the adhesive 23 will release the portion 40.

The next procedure that is desirable, although not absolutely necessary depending upon the particular equipment utilized, is illustrated schematically at 42 in FIG. 1 where marginal holes (often called tractor drive holes) are formed at appropriate places in the web utilizing a conventional marginal hole punch unit. After the formation of the tractor drive holes, which are illustrated schematically at 43 in FIG. 8, the web is wound—as illustrated schematically at 44 in FIG. 1—into a roll using conventional winding equipment, and then is transported to a machine for the application of a piggyback decal, such as the conventional equipment available from Tamarack. At the Tamarack machine the web is unwound utilizing a conventional unwinder thereat, as illustrated schematically at 45 in FIG. 1, and a piggyback decal is applied to the open area 46 (see FIG. 6) left by the removal of the portion 40 from the substrate 10. Typically the piggyback decal application is by blowing on the piggyback decal, as illustrated schematically at 47 in FIG. 1, the piggyback decal 46 being seen at 48 in FIGS. 7 and 8. While in FIG. 7 the piggyback decal 48 is shown having a greater thickness than the substrate 10, it is to be understood that it preferably has the same thickness, or it may be even slightly less thickness, in the preferred embodiment.

The piggyback decal 48 is a conventional decal for a license plate, such as having a bottom sheet 49 with a bottom surface thereof that adheres to the adhesive 23 and a top surface thereof that is release coated (such as silicone coated), a pressure sensitive adhesive layer 50, and a decal portion 51 which preferably has a visible surface 52 thereof that is highly reflective. The highly reflective surface 52 of the decal also typically will have indicia thereon or visible therethrough, such as the month of the year, or the year, when the decal must be replaced (that is the permit has expired). FIG. 8 schematically illustrates such indicia at 53.

The next procedure of the method according to the invention, as illustrated schematically at 55 in FIG. 1, is to slit off the tractor drive holes, such as slits being seen at 56 in FIG. 8 where the tractor drive holes 43 are removed in a marginal portion 57, and the web is formed into sheets 31, as illustrated schematically at 58 in FIG. 1, utilizing conventional sheeting equipment. Typically, then the sheets 31, which have a substantially lay-flat construction because of the method described above, are shipped as indicated at 59 in FIG. 1 to a customer, such as a governmental agency that performs vehicle permitting and registration, for the provision of variable indicia on at least the face 11. The variable indicia is preferably applied by laser printing, as illustrated schematically at FIG. 1, and typical locations for the variable indicia are illustrated at 61 in FIG. 8. Where the sheet 31 is used in vehicular permitting and registration, the indicia 61 will be vehicle registration and permitting indicia, which may include the registration number for the vehicle associated with the sheet 31, the owner or driver's name and address, and related indicia.

In one exemplary use of the sheet 31 in FIG. 8, it is stacked in the input tray for a conventional simplex laser printer and smoothly, typically without jamming or print problems, passes through the laser printer and after the indicia 61 is applied thereto the sheet 31 is either mailed to a recipient, or when the recipient comes in to a permitting location it is utilized. The sheet 31 may be separated at the perf lines 29, 30 (with the associated die cut 37 provided) and the portion 62 may have the registration information which is either kept by the owner or by the government agency, or the portion 62 may be further subdivided by perforations or the like so as to provide both the registration card for the owner and an office copy to be retained by the government agency. The vehicle owner removes the sticker 33 as facilitated by the die cuts 32, and the adhesive 23 adheres to the back of the sticker 33, releasing from the plastic 22 since the adhesive 23 has a higher affinity for the bond substrate 10 back surface 12 than it does for the plastic 22. The window sticker 33 is then applied as is conventional for vehicle inspection sticker (e.g. the entire sheet 31 may be provided at a state vehicle inspection station, and the sticker 33 may be applied by the state or private employee at the vehicle inspection station).

The owner, or another, may also remove the license plate decal 51, and press the adhesive 50 thereof at the appropriate location on a license plate. While only one license plate decal 51 is shown associated with the sheet 31 in most of the drawings, it is to be understood that a second license plate decal—shown schematically in dotted line at 51' in FIG. 8—may also be provided, and the sheet 31 could have other stickers or decals associated therewith.

It will be thus be seen that according to the present invention a method of making a substantially lay-flat laser printable sheet with at least one decal or sticker, and the substantially lay-flat laser printable sheet produced thereby, have been provided. The products produced according to the invention are advantageous compared to the prior art, particularly because of the versatility thereof and the lay-flat nature thereof, and the fact that they include a number of functions within the same 8½x11, A4, or legal size sheets 31 according to the invention. [While other size sheets 31 can be produced, letter size is preferred, and A4 and legal size are also appropriate.] The method according to the present invention is also simple and straight forward, and can be readily practiced utilizing conventional equipment.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of making substantially lay-flat laser printable sheet with at least one decal or sticker using a substrate having at least a laser printable face, and a back surface, comprising:

a) adhesive-release material spot coating the substrate back surface, including providing a substantially continuous first adhesive-release material patch;

b) imaging the back surface with first static indicia;

c) applying a substantially transparent plastic and pressure sensitive adhesive laminate over at least a significant part of the back surface, including over the spot coating and first static indicia;

d) die cutting the face at the first patch, substantially within the perimeter of the first patch to form a first die cut portion;

e) removing the first die cut portion from the substrate to provide an open area with exposed transparent plastic and pressure sensitive adhesive; and f) providing a piggyback decal on the open area.

2. A method as recited in claim 1 wherein the substrate is a web, and further comprising g), after e) and before f), providing marginal holes in the web, h) winding up the web, and i) unwinding the web.

3. A method as recited in claim 2 further comprising, after f), j) slitting the marginal holes off the web, and k) forming the web into substantially lay-flat laser printable sheets.

4. A method as recited in claim 3 wherein c) is practiced to apply the laminate over substantially the entire back surface of the substrate which will become the sheets from k).

5. A method as recited in claim 4 wherein e) is practiced by sucking off the die cut portion, and wherein f) is practiced by blowing on a reflective visible surface piggyback decal.

6. A method as recited in claim 5 further comprising l) variably imaging the face of the sheets from k) using a laser printer.

7. A method as recited in claim 6 wherein b) and l) are practiced to image vehicular registration or permitting indicia on the substrate.

8. A method as recited in claim 1 wherein c) is further practiced to apply a laminate transparent plastic that is matte and pen write-able, and having a thickness of about 0.5–2 mils.

9. A method as recited in claim 1 wherein a) is further practiced to form a second patch defining a border but substantially devoid of adhesive-release material within the border and wherein d) is practiced to provide a second face die cut at the second patch.

10. A method as recited in claim 9 wherein the substrate is a web, and further comprising, after f), forming the web into substantially lay-flat laser printable sheets.

11. A method as recited in claim 10 wherein a)–f) are further practiced to provide the second patch with vehicular registration or permitting indicia thereon and capable of functioning as a vehicle inspection sticker.

12. A method as recited in claim 9 further comprising g) forming a third die cut in the back surface which penetrates through the laminate to the substrate, an area defined by the third die cut being larger than an area defined by the second die cut, and substantially concentric therewith, and being substantially coextensive with lines of weakness formed in said substrate.

13. A method as recited in claim 1 further comprising static printing the substrate face prior to f).

14. A method as recited in claim 1 wherein a) is practiced using UV silicone adhesive release material; and further comprising curing the silicone release material prior to b)–f).

15. A method as recited in claim 1 wherein a) is practiced using bond paper as the substrate, and wherein a)–f) are practiced to produce laser printable sheets having either letter size, A4, or legal size dimensions.

16. A method as recited in claim 1 wherein a)–f) are practiced substantially sequentially.

* * * * *